United States Patent
Liang et al.

(10) Patent No.: US 10,185,704 B2
(45) Date of Patent: Jan. 22, 2019

(54) WEBPAGE BROWSING METHOD, WEBAPP FRAMEWORK, METHOD AND DEVICE FOR EXECUTING JAVASCRIPT AND MOBILE TERMINAL

(71) Applicant: Guangzhou UCWEB Computer Technology Co., Ltd., Guangdong (CN)

(72) Inventors: Jie Liang, Guangdong (CN); Miaokui Ma, Guangdong (CN)

(73) Assignee: GUANGZHOU UCWEB COMPUTER TECHNOLOGY CO., LTD., Guangdong (CN)

( * ) Notice: Subject to any disclaimer, the term of this patent is extended or adjusted under 35 U.S.C. 154(b) by 1026 days.

(21) Appl. No.: 14/368,753

(22) PCT Filed: Apr. 27, 2013

(86) PCT No.: PCT/CN2013/074887
§ 371 (c)(1),
(2) Date: Jun. 25, 2014

(87) PCT Pub. No.: WO2013/159745
PCT Pub. Date: Oct. 31, 2013

(65) Prior Publication Data
US 2015/0074513 A1    Mar. 12, 2015

(30) Foreign Application Priority Data
Apr. 28, 2012 (CN) .......................... 2012 1 0132741

(51) Int. Cl.
*G06F 17/30* (2006.01)
*G06F 17/22* (2006.01)
(Continued)

(52) U.S. Cl.
CPC ...... *G06F 17/2247* (2013.01); *G06F 9/44526* (2013.01); *G06F 17/30905* (2013.01); *G06F 9/45508* (2013.01)

(58) Field of Classification Search
CPC ....................... G06F 17/30905; G06F 17/2247
See application file for complete search history.

(56) References Cited

U.S. PATENT DOCUMENTS 6,311,180 B1 * 10/2001 Fogarty ............. G06F 17/30905
707/749
8,627,204 B2 * 1/2014 Coman ............. G06F 17/30905
715/243
(Continued)

FOREIGN PATENT DOCUMENTS

| CN | 101876897 A | 11/2010 |
|---|---|---|
| CN | 102073502 A | 5/2011 |

(Continued)

OTHER PUBLICATIONS

Lennon "Build Ext JS extensions and plug-ins", Nov. 23, 2010, pp. 1-20 https://www.ibm.com/developerworks/library/wa-extjs/#fig2.*

(Continued)

*Primary Examiner* — Scott T Baderman
*Assistant Examiner* — Mario M Velez-Lopez
(74) *Attorney, Agent, or Firm* — Alston & Bird LLP

(57) ABSTRACT

The disclosure provides a method for executing extended JavaScript (JS) by using an extended JS interface. The method includes the following steps: inquiring an extension program whether to execute the extended JS at a predetermined occasion when a webpage is loaded, wherein the extension program is loaded when a browser is started up; the browser assembles the extended JS interface according to an open application programming interface (API) when determining that the extended JS is needed to be executed;

(Continued)

executing the extended JS by using the extended JS interface. According to the disclosure, browsing mode and layout mode of a browser can be changed dynamically according to the requirement for webpage contents in the form of extension programs, accordingly browsing experience of users is improved.

23 Claims, 9 Drawing Sheets

(51) Int. Cl.
*G06F 9/445* (2018.01)
*G06F 9/455* (2018.01)

(56) References Cited

U.S. PATENT DOCUMENTS

| | | | | |
|---|---|---|---|---|
| 8,639,680 | B1* | 1/2014 | Ciccolo | G06F 17/30867 |
| | | | | 707/705 |
| 8,869,256 | B2* | 10/2014 | Sample | H04L 51/066 |
| | | | | 726/9 |
| 9,467,434 | B2* | 10/2016 | Shmulevich | H04L 63/08 |
| 2007/0256003 | A1* | 11/2007 | Wagoner | G06F 17/3089 |
| | | | | 715/205 |
| 2010/0281357 | A1 | 11/2010 | Fu et al. | |
| 2010/0293448 | A1* | 11/2010 | Rand | G06F 17/3087 |
| | | | | 715/206 |
| 2012/0066585 | A1* | 3/2012 | Caceres | G06F 17/218 |
| | | | | 715/235 |
| 2012/0110433 | A1* | 5/2012 | Pan | G06F 17/211 |
| | | | | 715/234 |
| 2013/0073946 | A1* | 3/2013 | Kang | G06F 17/30896 |
| | | | | 715/234 |
| 2015/0074513 | A1* | 3/2015 | Liang | G06F 9/44526 |
| | | | | 715/234 |
| 2015/0370912 | A1* | 12/2015 | Liang | G06F 17/248 |
| | | | | 715/234 |

FOREIGN PATENT DOCUMENTS

| | | |
|---|---|---|
| CN | 102214098 A | 10/2011 |
| CN | 102693280 A | 9/2012 |

OTHER PUBLICATIONS

Circarconsulting, "ExtJS", Feb. 5, 2012, pp. 1-2 http://www.circarconsulting.com/extjs.html.*
International Search Report for Application No. PCT/CN2013/074887 dated Aug. 8, 2013.

* cited by examiner

WEBPAGE BROWSING METHOD, WEBAPP FRAMEWORK, METHOD AND DEVICE FOR EXECUTING JAVASCRIPT AND MOBILE TERMINAL

FIELD

The disclosure relates to the field of mobile communication, and more particularly to a webpage browsing method implemented based on a WebApp framework, a WebApp framework, a method and device for executing JavaScript (JS) by using an extended interface, and a mobile terminal having the WebApp framework or the device for executing JS.

BACKGROUND

Currently, when the content of a webpage is browsed on a mobile terminal, since there are many unnecessary elements on the original webpage in a webpage server while the display screen of the mobile terminal is relatively small, problems including an unpleasant layout and complicated display may exist in this case during display on the mobile terminal if the original webpage is not processed particularly, thus greatly affecting user experience.

At present, forum display may be customized for various forums by many mobile phone browsers, such as QQ browser, Miren browser and UC browser. In other words, forum modes are customized. Existing forum modes are mainly implemented by the following two methods: 1. implemented with servers of browser manufacturers themselves; 2. implemented on local browser clients.

A forum mode implemented on a server of a browser manufacturer has some disadvantages. Firstly, browser operation and the server will depend on each other and data transmitted and received by a browser will inevitably pass through a device of the browser manufacturer, which is unacceptable for those who pay attention to privacy and security. Secondly, if the server of the browser manufacturer crashes due to some special reasons, the forum mode will become invalid. Finally, conversion of forum modes on servers of some browser manufacturers is not approved by some forums. Thus the Internet Protocol (IP) addresses of browsers of the manufacturers will be blacklisted, which may finally cause a failure of a user in accessing a forum mode.

In addition, some problems may be also caused by implementing a forum mode on a local browser client with an existing method. For example, Miren browser implements a forum mode on a local browser client and the following disadvantages may exist during implementation of the present Miren browser: firstly, there is not a set of general frameworks to support page transition of similar forum modes and it needs to continue to use hard codes as well if a reading mode or a novel mode needs to be added in the future, which is not good for future extension and maintenance. Secondly, a forum page will be opened very slowly because forum mode conversion is performed after layout and rendering of a system kernel are finished and a callback is dispatched, thus inevitably affecting the speed of opening the webpage to further influence user experience.

Additionally, popular websites including novel websites, news websites and forums are generally featured with many texts, thus websites of these types will divide these texts into many pages in many cases to take the performance of mobile phones into account and save webpage traffic. However, there is a drawback of such a method, that is, a user needs to click on a link including "next page" or "next chapter" on a screen during each page switching, and the user further needs to wait for a new page to open after clicking.

There have been some mobile phone browsers (e.g. QQ browser and UC browser) that support reading modes at present. A reading mode is able to turn those profound and plain texts including novels, news and forums etc. from a thick book into a piece of light and thin paper, and all can be read in a page to truly make electronic reading a users' favorite. In operation, such a change makes browsing more convenient, thus improving reading speed. However, all these mobile phone browsers implement functions of the reading modes by modifying browser source codes directly and adding implementation logic of the reading modes to the browsers, which nevertheless has many disadvantages:

firstly, development difficulty: compiling and re-linking are required during each modification of a small number of codes, and functions of other modules may be also affected incautiously; secondly, modification difficulty: when a user feeds back a bug, a browser developer fixes the bug, but the user needs to install a browser of a new version to eliminate influence of the bug; however, a browser installation package is generally large, and frequent updating will not only consume mobile phone traffic of the user, but also make the user feel tedious and inconvenient and consume the time of the user; finally, updating difficulty: when a reading mode is extended and new demands and new functions of the reading mode are realized, it also needs the user to download an installation package of a whole browser and reinstall the browser so as to apply the update, which is also tedious and consumes traffic.

In addition, adapt-screen layout and zoom layout are generally applied to layout of a mobile phone browser. These two patterns have their advantages and disadvantages: adapt-screen layout, which does not need left and right drags and page zooming, is more applicable to browsing experience of a mobile phone, but will result in a disordered and bad-looking page layout sometimes; zoom layout can fully recover a page effect like a Personal Computer (PC) with a beautiful page and without chaos; however, a user needs to drag and zoom constantly, which reduces browsing experience of the user.

At present some mobile phone browsers have begun supporting extensions to enhance browsing experience of users. For example, the browsing experience of a user may be enhanced on a mobile phone browser by a forum mode, a micro-blog reading mode, etc. While extensions of mobile phone browsers can provide more and better experience, browsers need to provide more and better open interfaces. The structure of a page Document Object Model (DOM) is changed by an extension through JS to implement re-layout of a page so that the page is more beautiful. For example, an unnecessary advertisement node is screened and a necessary element is extracted from a forum page to form a forum mode applicable to mobile phone browsing etc. Although these extensions can make page layout more beautiful by modifying a DOM tree, a problem is encountered, that is, a layout mode of a browser cannot be changed. In that case, when a mobile phone browser is in a zoom mode, although a page can be modified into a page applicable to adapt-screen reading of the mobile phone browser by an extension, good user experience cannot be provided because the mobile phone browser is always in zoom layout. Therefore, it is expected to provide an interface capable of changing the present browser layout modes for extensions of mobile phone browsers to implement better user experience.

SUMMARY

In view of the problem above, one purpose of the disclosure is to provide a method and a device for executing JS by using an extended interface. The other purpose of the disclosure is to provide a webpage browsing method implemented based on a WebApp framework and to provide a WebApp framework.

A method for executing extended JS by using an extended JS interface is provided according to an aspect of the disclosure, including: inquiring an extension program whether to execute the extended JS at a predetermined occasion when a webpage is loaded, wherein the extension program is loaded when a browser is started up; the browser assembles the extended JS interface according to an open Application Programming Interface (API) when determining that the extended JS is needed to be executed; and executing the extended JS by using the extended JS interface.

In one or more examples of the aspect above, the extended JS is executed to perform the following steps: through accessing a DOM tree of a current webpage, extracting a content required by page browsing; according to the extracted content, setting a layout mode of the browser through a preset interface configured to adjust a layout mode; based on the set layout mode, performing page layout for the extracted content.

In one or more examples of the aspect above, the extended JS is executed to perform the following steps: after receiving a first message sent by the browser which indicates to invoke a first JS application preregistered in a WebApp framework, a WebApp invokes the first JS application to determine whether a current webpage is a customizable forum page; the first JS application is set to be invoked after a head node is constructed, and is configured to determine a forum type of the current webpage; the first message is sent after the head node of the current webpage is constructed when the webpage is loaded to the browser; and when it is determined that the current webpage is a customizable forum page and after receiving a second message sent by the browser and indicating to invoke a second JS application preregistered in the WebApp framework, the WebApp invokes the second JS application corresponding to the forum type of the current webpage to generate and display a customized forum page; the second JS application is set to be invoked after a DOM tree is constructed and is configured to generate and display a forum page; the second message is sent after a DOM tree of the current webpage is constructed when the webpage is loaded to the browser.

In one or more examples of the aspect above, the extended JS is executed to perform the following steps: after receiving a fourth message sent by the browser which indicates to invoke a fourth JS application preregistered in a WebApp framework, a WebApp invokes the fourth JS application to execute the following steps: traverse a DOM tree to obtain a keyword included in a DOM node text; based on the keyword included in the DOM node text and a keyword database pre-stored in the WebApp framework, determine whether the keyword is a pre-read keyword; after determining that the included keyword is a pre-read keyword, repeat the following process for each pre-read keyword until all pre-read keywords are processed: according to the currently-obtained pre-read keyword, obtain a link address of the next webpage; according to the obtained link address, pre-read a content of the next webpage from a webpage server; and display the pre-read content of the next webpage and obtain the next pre-read keyword; wherein the fourth message is sent after a DOM tree of a current webpage is constructed; the fourth JS application is set to be invoked after a DOM tree is constructed and to be formed by a content script, and is pre-compiled in a WebApp installation package, and the fourth JS application is registered in the WebApp framework when the WebApp installation package is installed on the browser.

A webpage browsing method based on a WebApp framework is provided according to another prospect of the disclosure, including: after receiving a first message sent by a browser which indicates to invoke a first JS application preregistered in the WebApp framework, a WebApp invokes the first JS application to determine whether a current webpage is a customizable forum page; the first JS application is set to be invoked after a head node is constructed, and is configured to determine a forum type of the current webpage; the first message is sent after the head node of the current webpage is constructed when a webpage is loaded to the browser; and when it is determined that the current webpage is a customizable forum page and after receiving a second message sent by the browser which indicates to invoke a second JS application preregistered in the WebApp framework, the WebApp invokes the second JS application corresponding to the forum type of the current webpage to generate and display a customized forum page; the second JS application is set to be invoked after a DOM tree is constructed and is configured to generate and display a forum page; the second message is sent after a DOM tree of the current webpage is constructed when the webpage is loaded to the browser.

In one or more examples of the aspect above, the first JS application and the second JS application may be formed by a content script and pre-compiled in a WebApp installation package, and when the WebApp installation package is installed on the browser, the first and the second JS applications are registered in the WebApp framework.

In one or more examples of the aspect above, the first JS application is configured to: obtain a meta tag from a head node; and according to the obtained meta tag, determine a forum type of the webpage; and the second JS application is configured to: through traversing a DOM tree, extract forum page data corresponding to a customized forum mode in a current webpage; generate a forum page according to the extracted forum page data; and display the generated forum page.

In one or more examples of the aspect above, before displaying the generated forum page, the method further includes: hide and delete the original JS page.

In one or more examples of the aspect above, the method further includes: after receiving a third message sent by the browser which indicates to invoke a third JS application pre-registered in a WebApp framework, a WebApp invokes the third JS application to perform a process of determining a pre-read keyword and pre-reading and displaying contents of a webpage based on the determined pre-read keyword. In an example, the process of determining the pre-read keyword and pre-reading and displaying the contents of the webpage based on the determined pre-read keyword includes: traverse a DOM tree to obtain a keyword included in a DOM node text; based on the keyword included in the DOM node text and a pre-read keyword pre-stored in the WebApp framework, determine whether the keyword is a pre-read keyword; after determining that the included keyword is a pre-read keyword, repeat the following process for each pre-read keyword until all pre-read keywords are processed: according to the currently-obtained pre-read keyword, obtain a link address of the next webpage; according to the obtained link address, pre-read a content of the next webpage from a webpage server; and display the pre-read content of the next webpage and obtain the next pre-read keyword, wherein the third message is sent after a DOM tree of a current webpage is constructed; the third JS application is set to be invoked after the DOM tree is constructed and to be formed by a content script, and is pre-compiled in a WebApp installation package, and the third JS application is registered in the WebApp framework when the WebApp installation package is installed on the browser.

In one or more examples of the aspect above, before displaying the pre-read content of the next webpage, the method further includes: splicing the pre-read next webpage and the current webpage; and when the page scrolling distance of the current webpage exceeds a preset threshold, displaying the pre-read content of the next page.

In one or more examples of the aspect above, splicing the pre-read content of the next webpage and the current webpage includes: only extracting a body node of the next webpage from the pre-read next webpage; change changing the extracted body node into a DIV node while maintaining contents of the body node; setting an attribute of the DIV node to be hidden and then attached to the tail of a body node of the current webpage.

A webpage browsing method based on a WebApp framework is provided according to another aspect of the disclosure, including: after receiving a fourth message sent by a browser which indicates to invoke a fourth JS application preregistered in the WebApp framework, a WebApp invokes the fourth JS application to perform a process of determining a pre-read keyword, and pre-reading and displaying contents of a webpage based on the determined pre-read keyword. In an example, the process of determining the pre-read keyword, and pre-reading and displaying the contents of the webpage based on the determined pre-read keyword may include: traversing a DOM tree to obtain a keyword included in a DOM node text; based on the keyword included in the DOM node text and a keyword database pre-stored in the WebApp framework, determining whether the keyword is a pre-read keyword; after determining that the included keyword is a pre-read keyword, repeating the following process for each pre-read keyword until all pre-read keywords are processed: according to the currently-obtained pre-read keyword, obtain a link address of the next webpage; according to the obtained link address, pre-read a content of the next webpage from a webpage server; and display the pre-read content of the next webpage and obtain the next pre-read keyword, wherein the fourth message is sent after a DOM tree of a current webpage is constructed; the fourth JS application is set to be invoked after a DOM tree is constructed and to be formed by a content script, and is pre-compiled in a WebApp installation package, and the fourth JS application is registered in the WebApp framework when the WebApp installation package is installed on the browser.

In one or more examples of the aspect above, operations of the second JS application, the third JS application and/or the fourth JS application are executed by using an extended JS interface.

In one or more examples of the aspect above, when the contents of the current webpage are displayed, the extended JS interface is further configured to: according to an extracted content, set a layout mode of the browser by presetting an interface configured to adjust a page layout mode.

A device for executing JS using an extended JS interface is provided according to another aspect of the disclosure, including: an inquiring unit configured to inquire an extension program whether to execute the extended JS at a predetermined occasion when a webpage is loaded, wherein the extension program is loaded when a browser is started up; an assembling unit configured to assemble the extended JS interface according to an open API when determining that the extended JS is needed to be executed; and an executing unit configured to execute the extended JS by using the extended JS interface.

A WebApp framework is provided according to another aspect of the disclosure, including: a first invoking module configured to, after receiving a first message sent by a browser which indicates to invoke a first JS application preregistered in the WebApp framework, invoke the first JS application to determine whether a current webpage is a customizable forum page; the first JS application is set to be invoked after a head node is constructed, and is configured to determine a forum type of the current webpage; the first message is sent after the head node of the current webpage is constructed when a webpage is loaded to the browser; a second invoking module configured to, when it is determined that the current webpage is a customizable forum page and after receiving a second message sent by the browser which indicates to invoke a second JS application preregistered in the WebApp framework, invoke the second JS application corresponding to the forum type of the current webpage to generate and display a customized forum page; the second JS application is set to be invoked after a DOM tree is constructed and is configured to generate and display a forum page; the second message is sent after a DOM tree of the current webpage is constructed when the webpage is loaded to the browser.

In one or more examples of the aspect above, the WebApp framework may further include: a third invoking module configured to, after receiving a third message sent by the browser which indicates to invoke a third JS application preregistered in the WebApp framework, invoke the third JS application to execute a process of determining a pre-read keyword, and pre-reading and displaying contents of a webpage based on the determined pre-read keyword; in an example, the process of determining the pre-read keyword, and pre-reading and displaying the contents of the webpage based on the determined pre-read keyword includes: traversing a DOM tree to obtain a keyword included in a DOM node text; based on the keyword included in the DOM node text and a keyword database pre-stored in the WebApp framework, determining whether the keyword is a pre-read keyword; after determining that the included keyword is a pre-read keyword, repeating the following process for each pre-read keyword until all pre-read keywords are processed: according to the currently-obtained pre-read keyword, obtain a link address of the next webpage; according to the obtained link address, pre-read a content of the next webpage from a webpage server; and display the pre-read content of the next webpage and obtain the next pre-read keyword, wherein the third message is sent after a DOM tree of a current webpage is constructed; the third JS application is set to be invoked after a DOM tree is constructed and to be formed by a content script, and is pre-compiled in a WebApp installation package, and the third JS application is registered in the WebApp framework when the WebApp installation package is installed on the browser.

A browser is provided according to another aspect of the disclosure, including: a first message sending unit configured to, when loading a webpage and after constructing a head node of a current webpage, send a first message indicating to invoke a first JS application preregistered in a WebApp framework; the first JS application is set to be invoked after the head node is constructed and is configured to determine a forum type of the current webpage, and a second message sending unit configured to, when loading the webpage and after constructing a DOM tree of the current webpage, send a second message indicating to invoke a second JS application preregistered in the WebApp framework and corresponding to the forum type of the current webpage; the second JS application is set to be invoked after the DOM tree is constructed and is configured to generate and display a forum page.

A WebApp framework is provided according to another aspect of the disclosure, including: a fourth invoking module configured to, after receiving a fourth message sent by a browser which indicates to invoke a fourth JS application preregistered in the WebApp framework, invoke the fourth JS application to perform a process of determining a pre-read keyword, and pre-reading and displaying contents of a webpage based on the determined pre-read keyword; in an example, the process of determining the pre-read keyword, and pre-reading and displaying the contents of the webpage based on the determined pre-read keyword includes: traversing a DOM tree to obtain a keyword included in a DOM node text; based on the keyword included in the DOM node text and a keyword database pre-stored in the WebApp framework, determining whether the keyword is a pre-read keyword; after determining that the included keyword is a pre-read keyword, repeating the following process for each pre-read keyword until all pre-read keywords are processed: according to the currently-obtained pre-read keyword, obtain a link address of the next webpage; according to the obtained link address, pre-read a content of the next webpage from a webpage server; and display the pre-read content of the next webpage and obtain the next pre-read keyword, wherein the fourth message is sent after a DOM tree of a current webpage is constructed; the fourth JS application is set to be invoked after a DOM tree is constructed and to be formed by a content script, and is pre-compiled in a WebApp installation package, and the fourth JS application is registered in the WebApp framework when the WebApp installation package is installed on the browser.

In one or more examples of the aspect above, operations of the second JS application, the third JS application and/or the fourth JS application are executed by using an extended JS interface, and when the contents of the current webpage are displayed, the extended JS interface is further configured to: according to an extracted content, set a layout mode of the browser by presetting an interface configured to adjust a page layout mode.

A browser is provided according to another aspect of the disclosure, including: a fourth message sending unit configured to, when loading a webpage and after constructing a DOM tree of a current webpage, send a fourth message indicating to invoke a fourth JS application preregistered in a WebApp framework; the fourth JS application is configured to perform a process of determining a pre-read keyword, and pre-reading and displaying contents of a webpage based on the determined pre-read keyword; in an example, the process of determining the pre-read keyword, and pre-reading and displaying the contents of the webpage based on the determined pre-read keyword includes: traversing a DOM tree to obtain a keyword included in a DOM node text; based on the keyword included in the DOM node text and a keyword database pre-stored in the WebApp framework, determining whether the keyword is a pre-read keyword; after determining that the included keyword is a pre-read keyword, repeating the following process for each pre-read keyword until all pre-read keywords are processed: according to the currently-obtained pre-read keyword, obtain a link address of the next webpage; according to the obtained link address, pre-read a content of the next webpage from a webpage server; and display the pre-read content of the next webpage and obtain the next pre-read keyword, wherein the fourth JS application is set to be invoked after a DOM tree is constructed and to be formed by a content script, and is pre-compiled in a WebApp installation package, and the fourth JS application is registered in the WebApp framework when the WebApp installation package is installed on the browser.

A mobile terminal is provided according to another aspect of the disclosure, including: the WebApp framework, and the browser.

A mobile terminal is provided according to another aspect of the disclosure, including: the device for executing JS using an extended JS interface; and a browser.

A computer-readable medium with a program code executable by a processor is provided according to another aspect of the disclosure, when executed, the program code enables the processor to perform the following steps: inquire an extension program whether to execute extended JS at a predetermined occasion when a webpage is loaded, wherein the extension program is loaded when a browser is started up; the browser assembles an extended JS interface according to an open API when determining that the extended JS is needed to be executed; execute the extended JS by using the extended JS interface.

A computer-readable medium with a program code executable by a processor is provided according to another aspect of the disclosure, when executed, the program code enables the processor to perform the following steps: after receiving a first message sent by a browser which indicates to invoke a first JS application preregistered in a WebApp framework, a WebApp invokes the first JS application to determine whether a current webpage is a customizable forum page; the first JS application is set to be invoked after a head node is constructed, and is configured to determine a forum type of the current webpage; the first message is sent after the head node of the current webpage is constructed when a webpage is loaded to the browser; when it is determined that the current webpage is a customizable forum page and after receiving a second message sent by the browser which indicates to invoke a second JS application preregistered in the WebApp framework, the WebApp invokes the second JS application corresponding to the forum type of the current webpage to generate and display a customized forum page; the second JS application is set to be invoked after a DOM tree is constructed and is configured to generate and display a forum page; the second message is sent after a DOM tree of the current webpage is constructed when the webpage is loaded to the browser.

A computer-readable medium with a program code executable by a processor is provided according to another aspect of the disclosure, when executed, the program code enables the processor to perform the following steps: after receiving a fourth message sent by a browser which indicates to invoke a fourth JS application preregistered in a WebApp framework, a WebApp invokes the fourth JS application to perform a process of determining a pre-read keyword, and pre-reading and displaying contents of a webpage based on the determined pre-read keyword, wherein the fourth message is sent after a DOM tree of a current webpage is constructed; the fourth JS application is set to be invoked after a DOM tree is constructed and to be formed by a content script, and is pre-compiled in a WebApp installation package, and the fourth JS application is registered in the WebApp framework when the WebApp installation package is installed on the browser.

According to the disclosure, a forum mode page may be customized when a DOM tree is constructed and it is unnecessary to customize the forum mode page after a webpage is loaded, thus reducing the waiting time of a user so as to improve user experience.

In addition, according to the disclosure, automatic updating may be implemented through a content script of a WebApp by using an automatic updating strategy of the WebApp without operation of a browser server. Additionally, a forum mode and a reading mode are implemented through a WebApp without modifying a code of a browser itself, thus implementing simple maintenance. Moreover, a user may produce WebApps with different forum modes and reading modes as required. In other words, a method according to the disclosure is open.

In addition, according to the disclosure, more functions of a browser may be obtained in the form of extension programs by using extended JS so that extension modes are more flexible, thus satisfying the requirement of using different layout modes by different pages to improve the user browsing experience.

In order to achieve the above-mentioned and related purposes, one or more aspects of the disclosure include features to be described in details hereinafter and particularly pointed out in the claims. The following descriptions and accompanying drawings describe some illustrative aspects of the disclosure in details. However, these aspects only indicate some of the ways in which the principle of the disclosure may be applied. In addition, the disclosure intends to include all these aspects and their equivalents.

BRIEF DESCRIPTION OF THE DRAWINGS

The above and other purposes, features and advantages of the disclosure will become more apparent according to the following description with reference to the accompanying drawings. In the accompanying drawings.

Identical numerals in all accompanying drawings indicate similar or corresponding features or functions.

EMBODIMENTS

Specific embodiments of the disclosure will be described in details below in combination with the accompanying drawings.

Figure 1:
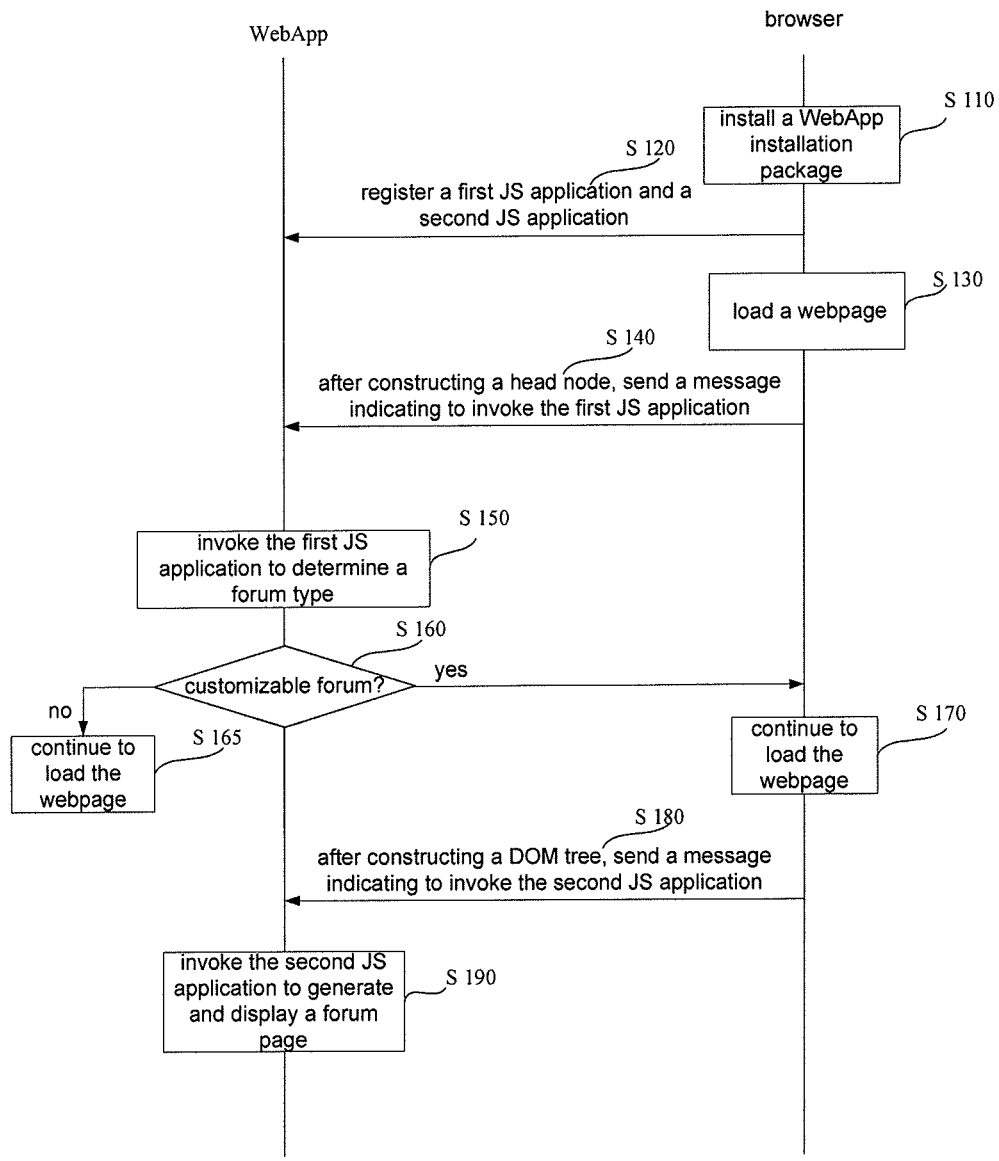
FIG. 1 shows a flowchart of a webpage browsing method based on a WebApp framework according to the first embodiment of the disclosure.

FIG. 1 shows a flowchart of a webpage browsing method based on a WebApp framework according to the first embodiment of the disclosure.

Before browsing a webpage by using the webpage browsing method of the disclosure, firstly, a WebApp installation package having a first JS application (i.e. a first JS application file) and a second JS application (i.e. a second JS application file) is compiled according to characteristics of a forum mode page expected to be customized. The first JS application and the second JS application are configured to store a JavaScript file and formed by a Content Script.

The first JS application is set to be invoked after a HEAD node is constructed, and is configured to determine a forum type of a current webpage. The first JS application is configured to obtain a meta tag from the head node, and determine according to the obtained meta tag, a forum type of a webpage. Here, the meta tag refers to an important code "<meta>" in a HyperText Markup Language (HTML) source code of a webpage. The meta tag is configured to describe an attribute of an HTML webpage document, e.g. an author, a date and time, webpage description, a keyword, page refreshing, and a forum type etc. There may be many forum types, e.g. Discuz! X2, Discuz ! X1.5, and phpwind etc. For example, when such a tag as: <meta name="generator" content="Discuz! X2"> appears, it may be determined to be a "Discuz! X2" type forum, and when such a tag as: <meta name="generator" content="Discuz ! X1.5"> appears, it may be determined as a "Discuz! X1.5" type forum.

The second JS application is set to be invoked after a DOM tree is constructed and is configured to generate and display a forum page. The second JS application is configured to extract forum page data corresponding to a customized forum mode in the current webpage through traversing the DOM tree; generate a forum page according to the extracted forum page data; and display the generated forum page.

After the WebApp installation package having the first and second JS application files is produced as above, as shown in FIG. 1, firstly, in Step S110, the produced WebApp installation package is installed in a browser of a mobile terminal client. After installing the WebApp installation package, in Step S120, the first JS application and the second JS application are registered in a WebApp framework. Here, the WebApp framework is similar to an Operating System (OS). Various applications, such as a JS application may be run on the WebApp framework. The steps above may be performed in advance before a user browses a webpage, or may be performed in real time when the user browses the webpage.

Subsequently, when the user opens a forum page through the mobile terminal client and browses the webpage, in Step S130, a current webpage expected to be browsed by the user is loaded in the browser of the mobile terminal client from a webpage server.

When the webpage is loaded and after a head node is constructed, the browser sends to a WebApp a first message indicating to invoke the first JS application (Step S140). For example, the first message may be HEAD_END or BODY_START, the message HEAD_END is configured to indicate ending of the HEAD node, and the message BODY_START is configured to indicate start of a BODY node. The browser may send the message HEAD_END or BODY_START to the WebApp to indicate to invoke the first JS application. With respect to the time of sending the first message, the first message may be sent when the browser has constructed the head node, or may be also sent when the browser starts constructing the BODY node or after the BODY node is constructed. In other words, the first message may be sent anytime after the HEAD node is constructed, and is preferably sent before the DOM tree is constructed. Specifically, in an example, when loading the webpage, the browser obtains source codes of the webpage from a network first. When these source codes are parsed, a BODY tag may be parsed. Once the BODY tag is parsed, an example of a BODY node will be established in browser codes. When the example is established successfully, the WebApp framework may be notified that the BODY node has been constructed, thus indicating the WebApp to invoke the first JS application file.

Figure 2:
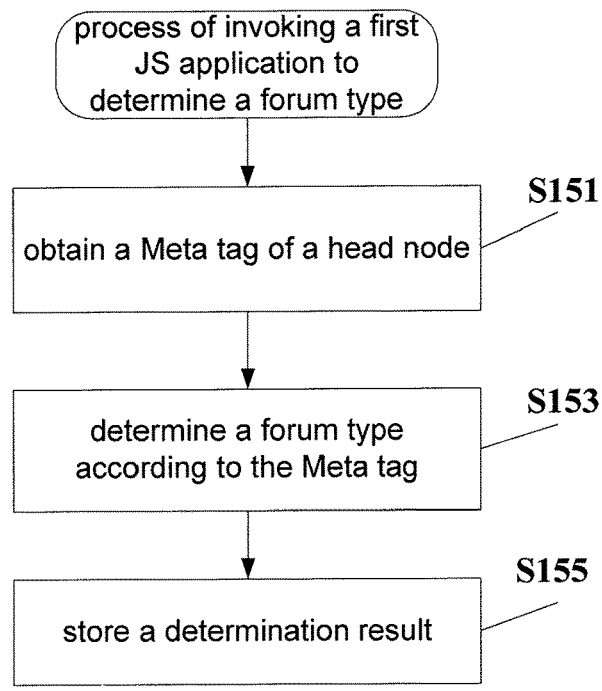
FIG. 2 shows an illustrative process of invoking a first JS application to determine a forum type in FIG. 1.

After invoking the first JS application file, the WebApp determines a forum type by invoking the first JS application file (Step S150). In an example, as shown in FIG. 2, according to the obtained source codes of the current webpage, a Meta tag in the HEAD node is obtained (Step S151), and the forum type of the current webpage is determined according to the obtained Meta tag (Step S153). Subsequently, the determined forum type is stored in the WebApp (S155). In another example of the disclosure, the determined forum type may not be stored.

Subsequently, in Step S160, the WebApp determines, according to the determined forum type, whether the forum page is a customizable forum. If the forum page is not a customizable forum, then in Step S165, the browser continues to load the current webpage, and displays the loaded webpage after the loading.

If the forum page is a customizable forum, then in Step S170, the browser continues to load the current webpage. And after constructing the DOM tree, the browser sends to the WebApp a second message indicating to invoke the second JS application (Step S180). The second message may be a DOCUMENT_END message, for example. The DOCUMENT_END message indicates ending of a document. Specifically, the browser may construct the DOM tree when parsing the source codes obtained from the network. After all source codes of the webpage are parsed, a whole DOM tree will be constructed. At the moment, the second message indicating to invoke the second JS application may be sent to the WebApp framework. Similarly, the second message may be a message in any form, as long as the WebApp can determine, after receiving the message, that the second JS application should be invoked.

Figure 3:
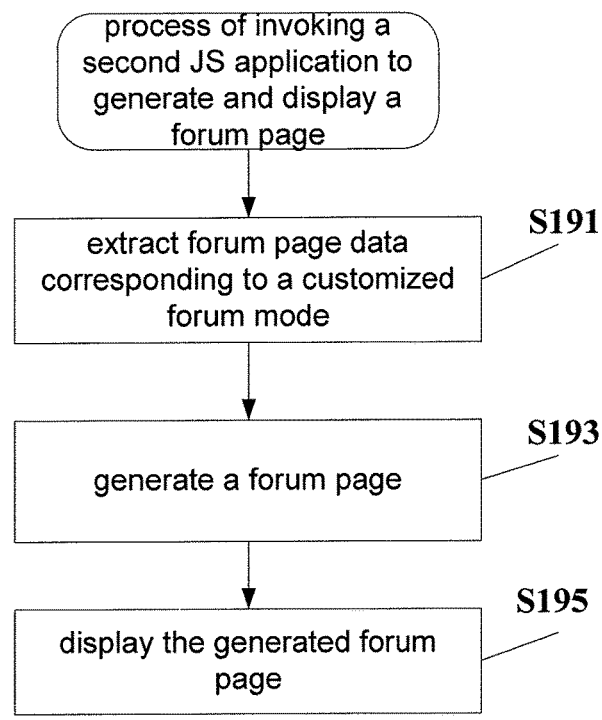
FIG. 3 shows an illustrative process of invoking a second JS application to generate and display a forum page in FIG. 1.

After receiving the second message from the browser, in Step S190, the WebApp invokes the second JS application to generate and display the forum page. Specifically, in an example, as shown in FIG. 3, firstly, the WebApp extracts forum page data corresponding to the customized forum mode in the current webpage through traversing the DOM tree (Step 191). Subsequently, a forum page is generated by using the extracted forum page data (Step 193), and then the generated forum page is displayed (Step 195). Preferably, in another example of the disclosure, the original webpage may be also hidden or deleted before displaying the generated forum page. A method for hiding the original webpage includes: set a Cascading Style Sheet (CSS) attribute of a node of the original webpage, and the original webpage can be hidden by setting the CSS attribute. A method for deleting the original webpage includes: invoke an interface removeChild provided by JS to delete a webpage node.

Figure 4:
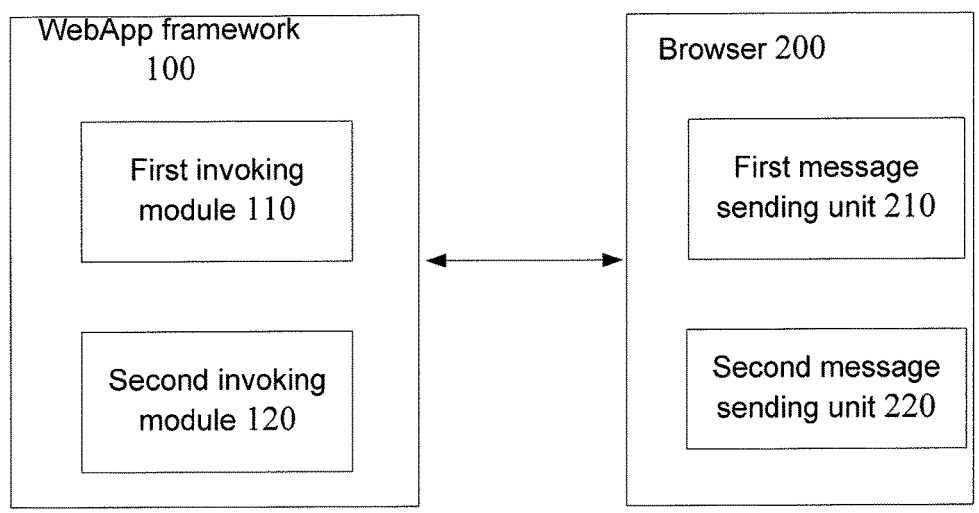
FIG. 4 shows a block diagram of a mobile terminal having a WebApp framework and a browser according to the first embodiment of the disclosure.

FIG. 4 shows a block diagram of a mobile terminal 10 having a WebApp framework and a browser according to the first embodiment of the disclosure. As shown in FIG. 4, the mobile terminal 10 includes a WebApp framework 100 and a browser 200.

The WebApp framework 100 further includes a first invoking module 110 and a second invoking module 120. The first invoking module 110 is configured to, after receiving a first message sent by the browser which indicates to invoke a first JS application preregistered in the WebApp framework, invoke the first JS application to determine whether a current webpage is a customizable forum page; the first JS application is set to be invoked after a HEAD node is constructed, and is configured to determine a forum type of the current webpage; the first message is sent after the HEAD node of the current webpage is constructed when a webpage is loaded to the browser;

the second invoking module 120 is configured to, when it is determined that the current webpage is a customizable forum page and after receiving a second message sent by the browser which indicates to invoke a second JS application preregistered in the WebApp framework, invoke the second JS application corresponding to the forum type of the current webpage to generate and display a customized forum page, the second JS application is set to be invoked after a DOM tree is constructed and is configured to generate and display a forum page; the second message is sent after a DOM tree of the current webpage is constructed when the webpage is loaded to the browser.

Besides common functions of a browser, the browser 200 further includes a first message sending unit 210 and a second message sending unit 220.

The first message sending unit 210 is configured to, when loading the webpage and after constructing the head node of the current webpage, send the first message indicating to invoke the first JS application preregistered in the WebApp framework; the first JS application is set to be invoked after the HEAD node is constructed and is configured to determine the forum type of the current webpage.

The second message sending unit 220 is configured to, when loading the webpage and after constructing the DOM tree of the current webpage, send the second message indicating to invoke the second JS application preregistered in the WebApp framework and corresponding to the forum type of the current webpage; the second JS application is set to be invoked after the DOM tree is constructed and is configured to generate and display the forum page.

The webpage browsing method and system based on a WebApp framework according to the first embodiment of the disclosure are described with reference to FIG. 1 and FIG. 4 as above.

Using the webpage browsing method and system according to the first embodiment of the disclosure, when opening a forum page, a mobile terminal client can identify a type of forum automatically by using a content Script of a WebApp, and invoke different JS codes according to the type of the forum to customize a page and finally generate a clean and clear forum mode page to replace an original complex forum page. In addition, when a customized content or a display effect is expected to be modified in the future, it only needs to produce a new WebApp installation package and install the installation package on a browser. Thus, the browser can run a WebApp in a forum mode like an OS. According to this manner, a set of WebApp frameworks can be implemented in a local browser client without being supported by operation of a server and a forum mode of a forum page can be customized through a content script, thus operation of a client browser is independent of a server of a browser manufacturer.

In addition, using the present embodiment, a page in a forum mode can be customized when a DOM tree is constructed, instead of being customized after a webpage is loaded. Additionally, an implementation mode of a forum mode may be updated in the background by using a WebApp automatic updating strategy so as to implement automatic updating. In addition, it is simple in maintenance, a forum mode may be implemented by a WebApp. It is unnecessary to modify codes of a browser itself. Moreover, the method according to the disclosure is open, and a user may produce WebApps for some special forum modes.

Figure 5:
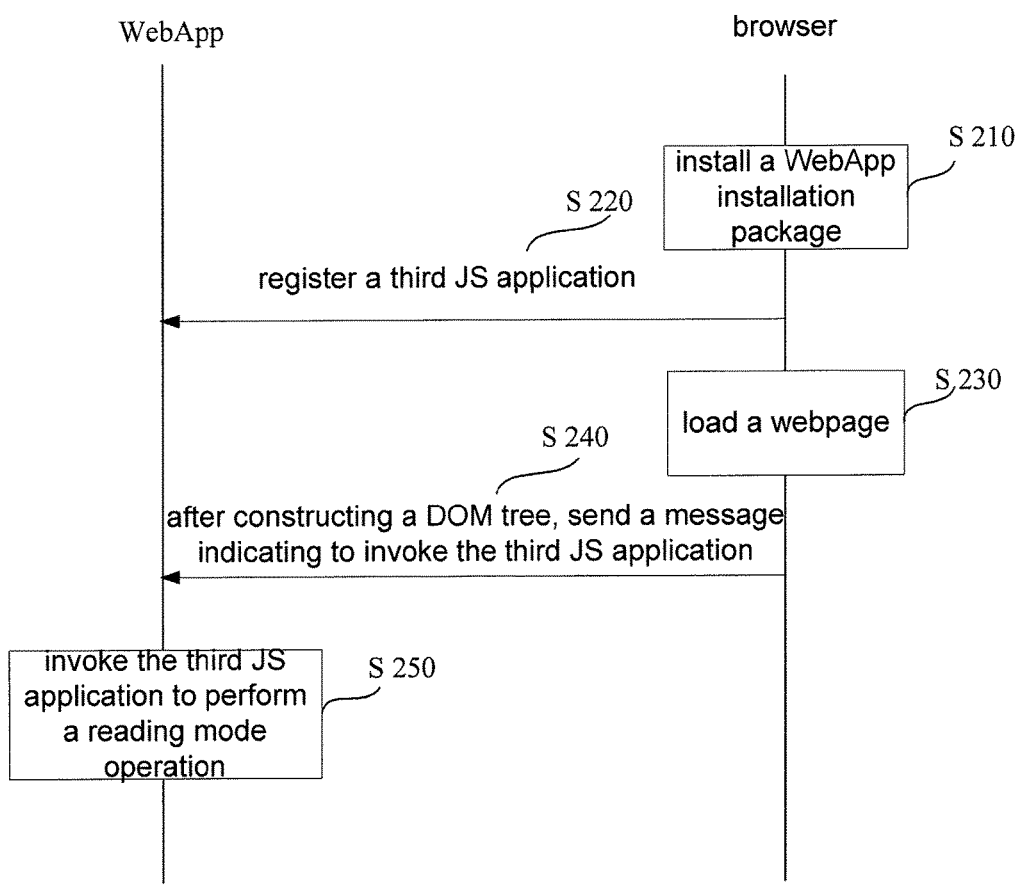
FIG. 5 shows a flowchart of a webpage browsing method based on a WebApp framework according to the second embodiment of the disclosure.

FIG. 5 shows a flowchart of a webpage browsing method based on a WebApp framework according to the second embodiment of the disclosure.

Similar to the first embodiment, a WebApp installation package having a third JS application also needs to be compiled before browsing with the webpage browsing method as shown in FIG. 5. The third JS application is configured to store a JS script file and is formed by a Content Script. The third JS application is set to be invoked after a DOM tree is constructed, and is configured to determine a pre-read keyword and perform a process of pre-reading and displaying contents of a webpage based on the determined pre-read keyword. In the example as shown in FIG. 5, the process of determining the pre-read keyword and pre-reading and displaying the contents of the webpage based on the determined pre-read keyword includes: a WebApp traverses the DOM tree to obtain a keyword included in a DOM node text; based on the keyword included in the DOM node text and a keyword database which includes pre-read keywords and is pre-stored in the WebApp framework, determine whether the keyword is a pre-read keyword; after determining that the included keyword is a pre-read keyword, repeat the following process for each pre-read keyword until all pre-read keywords are processed: according to the currently-obtained pre-read keyword, obtain a link address of the next webpage; according to the obtained link address, pre-read a content of the next webpage from a webpage server; and display the pre-read content of the next webpage and obtain the next pre-read keyword. Pre-read keywords of the keyword database pre-stored in the WebApp may be collected by means of observing a large number of websites. The pre-read keyword is "next page", "next chapter", "next section" and so on, for example. The keyword database is stored in a configuration file of the WebApp and all pre-read keywords in configurations are read when the WebApp is started.

After the WebApp installation package is produced as above, before or when browsing a webpage, in Step S210, the WebApp installation package is installed in a browser. After the installation is completed, in Step S220, the third JS application is registered in the WebApp.

Subsequently, when a user opens the webpage with a mobile terminal client to browse the webpage, in Step S230, a current webpage expected by the user to be browsed is loaded from a webpage server into the browser on the mobile terminal client.

When the webpage is loaded and after the DOM tree is constructed, the browser sends to the WebApp a third message indicating to invoke the third JS application (Step S240). Here, similarly, the third message may apply a message of any form, as long as the WebApp can determine, after receiving the message, that the third JS application should be invoked.

Subsequently, in Step S250, the WebApp invokes the third JS application to perform a reading mode operation.

Figure 6:
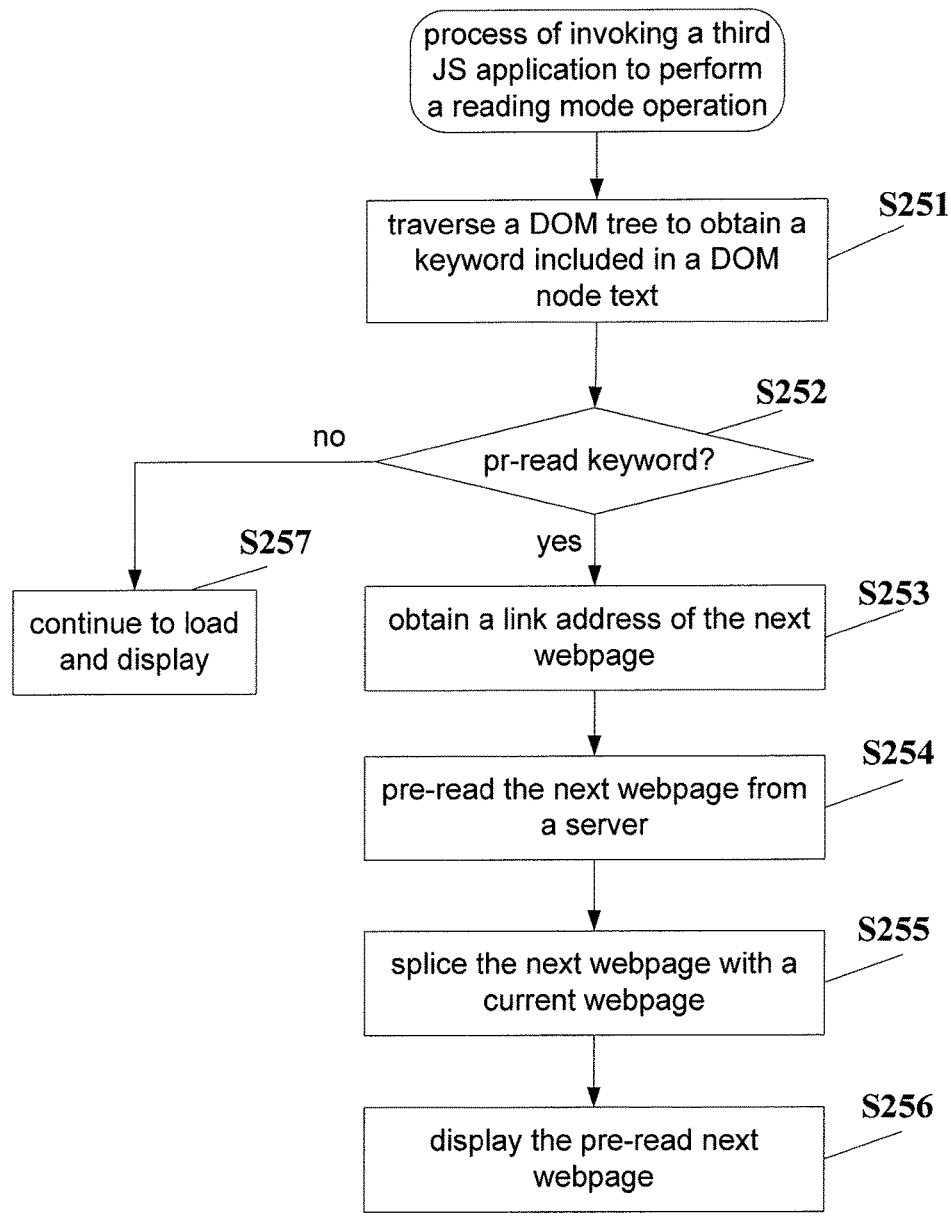
FIG. 6 shows an illustrative process of invoking a third JS application to perform a reading mode operation in FIG. 5.

Specifically, as shown in FIG. 6, when the reading mode operation is performed, the WebApp traverses the DOM tree first to obtain a keyword included in a DOM node text (Step 251), and then matches the obtained keyword with a pre-read keyword pre-stored in configuration of the WebApp to determine whether the keyword is a pre-read keyword (Step 252), and if yes, determines that a reading mode is started, and performs Step 253, otherwise, determines that the reading mode is not started, and performs Step 257, and in Step 257, continues to load the webpage to display the webpage.

A method for traversing a DOM tree provided by JS currently is able to search all child nodes of a DOM node through invoking a childNodes attribute of a node to continue to traverse these child nodes and so on. By invoking an innerText attribute of a node, a display text of the node can be obtained. Once a text of a node is acquired, a pre-read keyword previously stored in configuration is compared with content of this node by using a character string matching method provided by JS. If a pre-read keyword is found in a set of pre-read keywords, and content of the pre-read keyword is the same as content of the text, it may be deemed that a current page may enter a reading mode.

After determining that the reading mode is started, as shown in FIG. 6, the following process is executed repeatedly for each pre-read keyword until all pre-read keywords are processed: according to the currently-obtained pre-read keyword, obtain a link address of the next webpage (Step 253), e.g. a text of the link address of the next page is obtained through a JavaScript DOM operation. Subsequently, a content of the next webpage is pre-read from a webpage server according to the obtained link address (Step 254), e.g. based on the link address, a request is sent to a webpage server to obtain the content of the webpage. Subsequently, the next webpage is spliced with the current webpage (Step 255), and when the page scrolling distance of the current webpage exceeds a preset threshold, the pre-read content of the next webpage is displayed and the next pre-read keyword is obtained (Step 256). Of course, in another example of the disclosure, the next webpage may be also not spliced with the current webpage, and the next webpage is displayed only after the current webpage has been browsed. Subsequently, Step 253 to Step 256 are repeated for the next pre-read keyword until the operation above is completed for all pre-read keywords.

Figure 7:
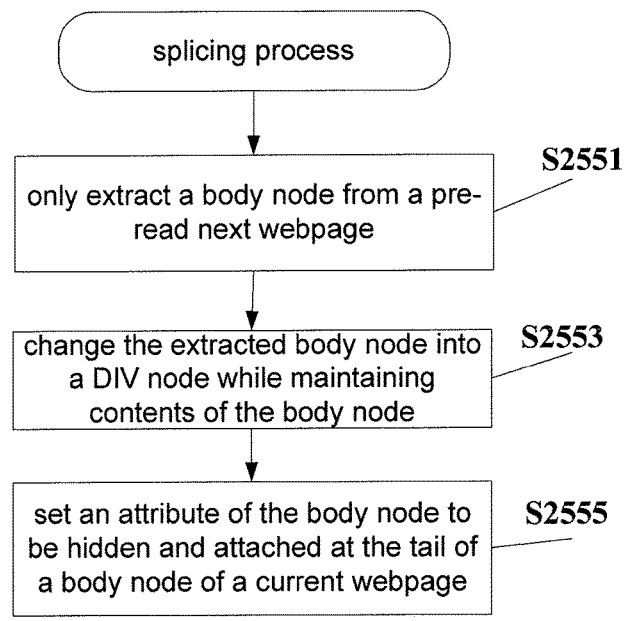
FIG. 7 shows a flowchart of an illustrative splicing process.

In addition, in another example of the disclosure, as shown in FIG. 7, splicing the pre-read next webpage with the current webpage may further include: only extract a BODY node of the next webpage from the pre-read next webpage (Step 2551); change the extracted BODY node into a DIV node while maintaining contents of the BODY node (Step 2553); and set an attribute of the DIV node to be hidden and then attached to the tail of a BODY node of the current webpage (Step 2555).

As illustrated above, an implementation method of a process for determining a pre-read keyword and re-reading and displaying contents of a webpage based on the determined pre-read keyword is shown, and the process above may be also implemented by other methods known in the art.

Figure 8:
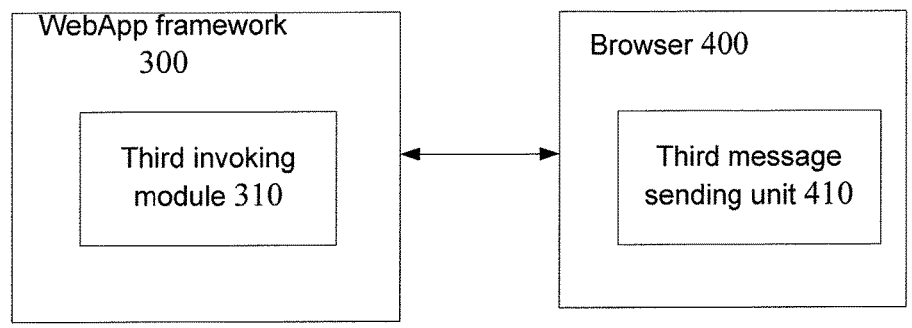
FIG. 8 shows a block diagram of a mobile terminal having a WebApp framework and a browser according to the second embodiment of the disclosure.

FIG. 8 shows a block diagram of a mobile terminal 20 having a WebApp framework and a browser according to the second embodiment of the disclosure. As shown in FIG. 8, the mobile terminal 20 includes the WebApp framework 300 and a browser 400.

The WebApp framework 300 includes a third invoking module 310 configured to, after receiving a third message sent by the browser which indicates to invoke a third JS application preregistered in the WebApp framework, invoke the third JS application. The third JS application is configured to perform the following process: traverse a DOM tree to obtain a keyword included in a DOM node text; based on the keyword included in the DOM node text and a keyword database pre-stored in the WebApp framework, determine whether the keyword is a pre-read keyword; after determining that the included keyword is a pre-read keyword, repeat the following process for each pre-read keyword until all pre-read keywords are processed: according to the currently-obtained pre-read keyword, obtain a link address of the next webpage; according to the obtained link address, pre-read a content of the next webpage from a webpage server; and display the pre-read content of the next webpage and obtain the next pre-read keyword, wherein the third message is sent after a DOM tree of a current webpage is constructed; the third JS application is set to be invoked after a DOM tree is constructed and to be formed by a content script, and is pre-compiled in a WebApp installation package, and the third JS application is registered in the WebApp framework when the WebApp installation package is installed on the browser.

The browser 400 includes a third message sending unit 410 configured to, when loading a webpage and after constructing the DOM tree of the current webpage, send a third message indicating to invoke a third JS application preregistered in the WebApp framework; the third JS application is configured to perform the following process: traverse a DOM tree to obtain a keyword included in a DOM node text; based on the keyword included in the DOM node text and a keyword database pre-stored in the WebApp framework, determine whether the keyword is a pre-read keyword; after determining that the included keyword is the pre-read keyword, repeat the following process for each pre-read keyword until all pre-read keywords are processed: according to the currently-obtained pre-read keyword, obtain a link address of the next webpage; according to the obtained link address, pre-read a content of the next webpage from a webpage server; and display the pre-read content of the next webpage and obtain the next pre-read keyword, wherein the third JS application is set to be invoked after a DOM tree is constructed and to be formed by a Content Script, and is pre-compiled in a WebApp installation package, and the third JS application is registered in the WebApp framework when the WebApp installation package is installed on the browser.

A webpage browsing method and system based on a WebApp framework according to the second embodiment of the disclosure are described with reference to FIG. 5 to FIG. 8 as above.

According to the method of the present embodiment, pre-reading and assembly of a reading mode may be performed through a content script of a WebApp for a page entering a reading mode without operation of a browser server. According to this method, an implementation method of a reading mode may be updated in the background by using a WebApp automatic updating strategy, which is timelier and saves more traffic. In addition, maintenance is simple, and a reading mode may be implemented by a WebApp without changing codes of a browser itself. Moreover, the method is open, and a user may produce WebApps of different reading modes as required.

In addition, it should be noted here that the first embodiment and the second embodiment of the disclosure may be combined to form a new embodiment. For example, the third JS application in the second embodiment of the disclosure is combined with the first JS application and the second JS application of the first embodiment, and the third invoking module of the second embodiment is added to the WebApp of the first embodiment to implement a technical solution of entering a reading mode after displaying a forum page. Here, the second JS application and the third JS application may be executed simultaneously or may be also executed one after another.

It should be noted here that the third invoking module, the third JS application, the third message sending module and the third message mentioned in the WebApp frame of the second embodiment correspond to the fourth invoking module, the fourth JS application, the fourth message sending module and the fourth message in claim 4 and claim 12, respectively. When the second embodiment is used in combination with the first embodiment, the third invoking module, the third JS application, the third message sending module and the third message mentioned in the WebApp framework according to the second embodiment correspond to the third invoking module, the third JS application, the third message sending module and the third message in claim 9 and claim 18, respectively.

Figure 9:
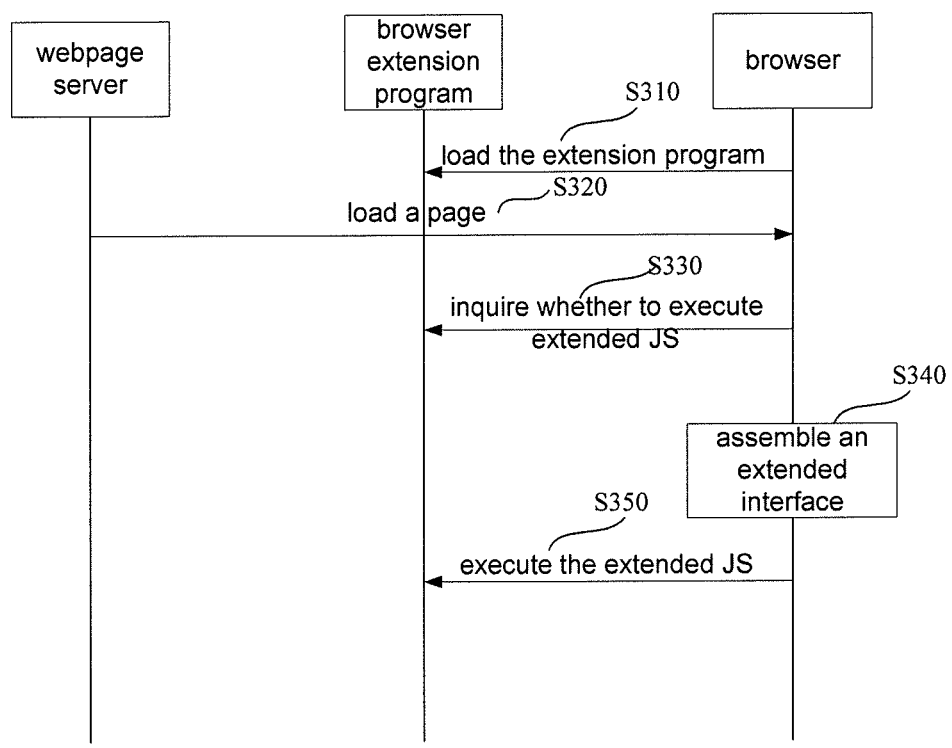
FIG. 9 shows a flowchart of a method for executing extended JS by using an extended JS interface according to the third embodiment of the disclosure.

FIG. 9 shows a flowchart of a method for executing extended JS by using an extended JS interface according to the third embodiment of the disclosure.

As shown in FIG. 9, firstly, when a browser is started up, a browser extension program is loaded (Step S310). Subsequently, in a browsing process of the browser, a webpage required by a client is loaded from a webpage server to the browser (Step S320). Then, when the webpage is loaded, the browser inquires the extension program at a predetermined occasion whether to execute extended JavaScript (Step S330). The predetermined occasion refers to a time before or after a DOM tree is constructed, for example.

When it is determined that the extended JavaScript needs to be executed, the browser assembles an extended JS interface according to an open API (Step S340). After the extended JS interface is assembled, the extended JavaScript is executed by using the extended JS interface (Step S350) so as to execute various applications as required by a user.

Figure 10:
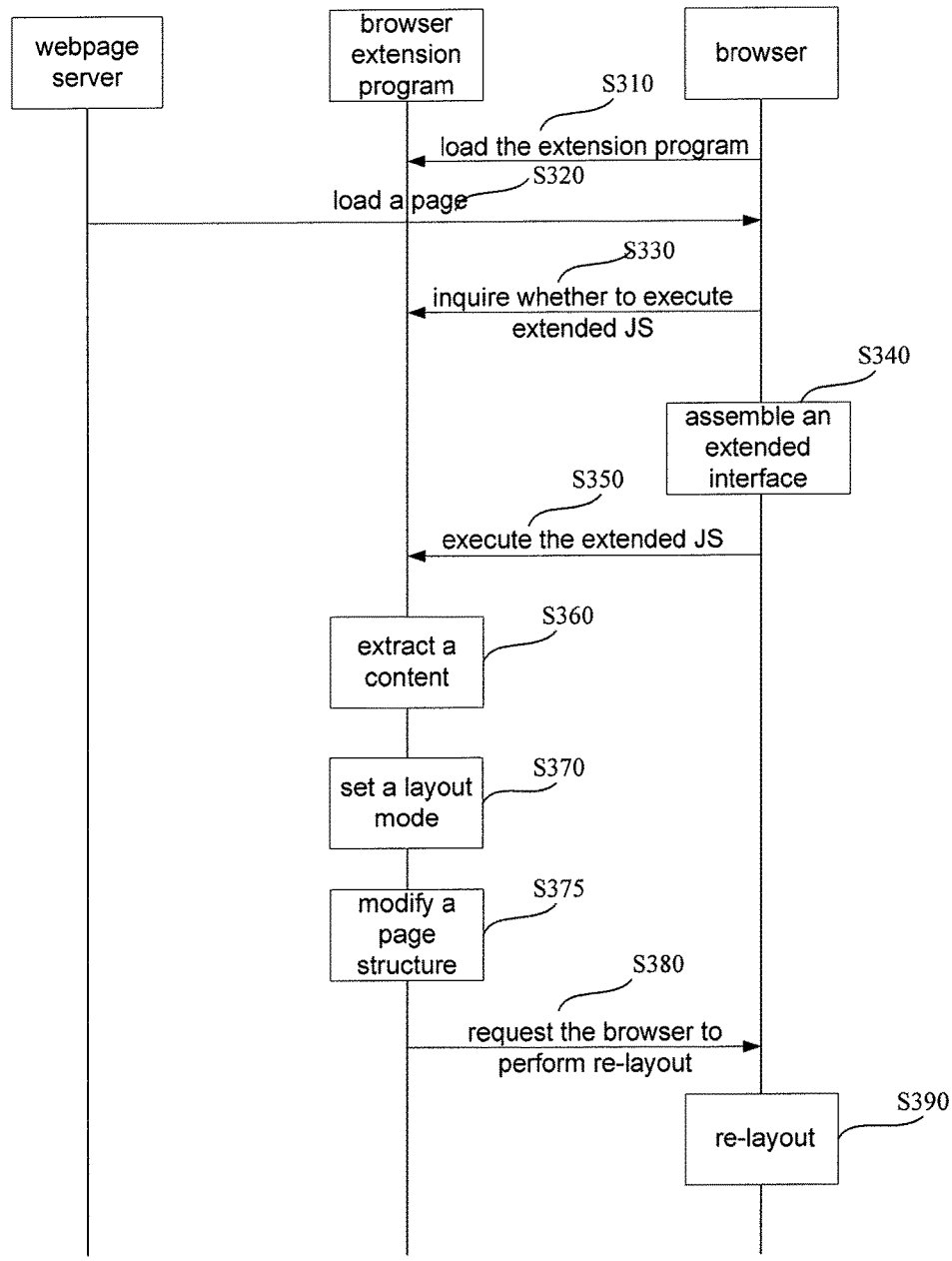
FIG. 10 shows a flowchart of a method for performing page layout control by executing JS with the extended JS interface of FIG. 9.

FIG. 10 shows a flowchart of a method for performing page layout control by executing JavaScript with the extended JS interface of FIG. 9.

Step S310 to Step S350 in FIG. 10 are completely the same as Step S310 to Step S350 in FIG. 9 and will not be described repeatedly here. Steps in FIG. 10, which are different from those in FIG. 9, will be described from Step S360 below. In Step S360, a content required to browse a page is extracted by accessing a DOM tree of a current webpage. Subsequently, according to the extracted content, a layout mode of the browser is set through a preset interface configured to adjust a page layout mode (Step S370). For example, the layout mode is set through ucweb.tabs.setLayout(layout). Subsequently, in Step S375, a page structure of page content from a webpage server is modified. For example, an unnecessary element is screened and a specific element is generated. Subsequently, the browser is requested to change a layout mode of the current page according to the set layout mode (Step S380), thus the browser performs layout over again according to the set layout mode (Step S390).

An example of ucweb.tabs.setLayout(integer layout) is described as follows.

Interface name: ucweb.tabs.setLayout(integer layout).

Interface description: the interface is configured to change a layout mode of a page dynamically. The layout mode may be zoom layout or adapt-screen layout.

Input parameters: constant values for identifying layout modes, i.e. ucweb.tabs.ZOOM_LAYOUT represents zoom layout while ucweb.tabs.ADAPT_SCREEN_LAYOUT represent adapt-screen layout.

Return value: null

Example:ucweb.tabs.setLayout(ucweb.tabs.ADAPT_SCREEN_LAYOUT)

Two examples of dynamically changing a layout mode of a browser by using the method according to the third embodiment of the disclosure are described as follows.

The first example is aimed at the situation of an extension program of a forum mode. In this situation, it is found that a page is able to enter the forum mode during zoom layout. Contents that need to be displayed by the forum mode are extracted from the original page by JavaScript of the extension program of the forum mode, and after unnecessary contents are screened, the contents are displayed to a user in an adapt-screen layout mode. Then, the extension program of the forum mode can set a layout mode of a mobile phone browser to be adapt-screen layout through invoking a ucweb.tabs.setLayout(ucweb.tabs.ADAPT_SCREEN_LAYOUT) interface, thus providing a beautiful browsing experience with easy interaction to the user.

The second example is aimed at an extension program of a reading mode. In this case, a user enters the reading mode in zoom layout, and the extension program also requests a browser to set the browser as adapt-screen layout. If finding that the experience in the reading mode is undesirable after entering the reading mode, the user will exit the reading mode. At the moment, the extension program needs to revert the layout mode to the previous zoom layout, and the layout mode may be set as zoom layout by invoking a ucweb.tabs.setLayout(ucweb.tabs.ZOOM_LAYOUT) interface. The extension program can perform switching among different layout modes automatically, thus bringing better browsing experience to the user.

In addition, the webpage browsing method aimed at a forum mode according to the first embodiment of the disclosure may be also executed by using the extended JS interface as shown in FIG. 9. The process may be implemented through combining the process as shown in FIG. 9 and the process as shown in FIG. 1 or a variant thereof. In addition, the webpage browsing method aimed at a reading mode according to the second embodiment of the disclosure may be also executed by the extended JS interface as shown in FIG. 9. The process may be implemented through combining the process as shown in FIG. 9 and the process as shown in FIG. 5 or a variant thereof.

Figure 11:
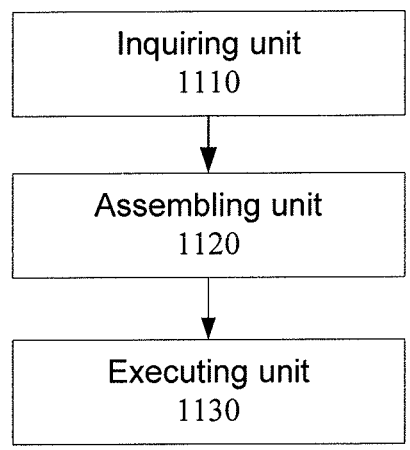
FIG. 11 shows a block diagram of a device for executing extended JS by using an extended JS interface according to the third embodiment of the disclosure.

FIG. 11 shows a block diagram of a device 1100 for executing extended JavaScript by using an extended JS interface according to the third embodiment of the disclosure. As shown in FIG. 11, the device 1100 includes an inquiring unit 1110, an assembling unit 1120 and an executing unit 1130.

The inquiring unit 1110 is configured to inquire an extension program whether to execute the extended JavaScript at a predetermined occasion when a webpage is loaded, wherein the extension program is loaded when a browser is started up. The assembling unit 1120 is configured to assemble the extended JS interface according to an open API when determining that the extended JavaScript is needed to be executed. The executing unit 1130 configured to execute the extended JavaScript by using the extended JS interface. In an example, the extended JavaScript is configured to perform the following process: through accessing DOM tree of a current webpage, extract a content required by page browsing; according to the extracted content, set a layout mode of the browser through a preset interface configured to adjust a layout mode; based on the set layout mode, perform page layout for the extracted content.

Figure 12:
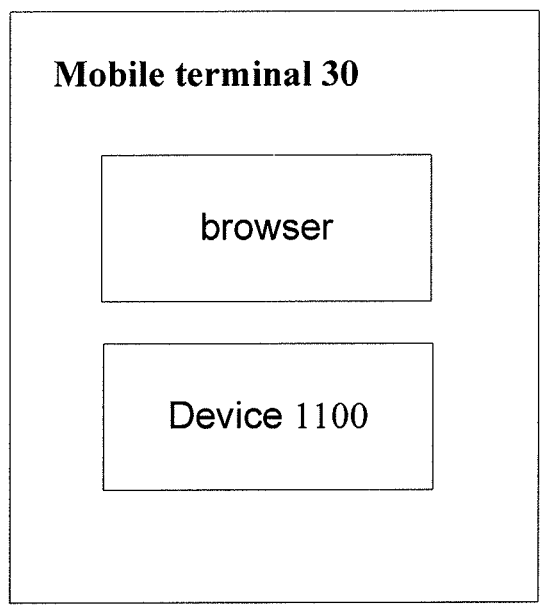
FIG. 12 shows a block diagram of a mobile terminal having a device for performing page layout control with an extended JS interface according to the disclosure.

FIG. 12 shows a block diagram of a mobile terminal 30 having a device for performing page layout control with an extended JS interface according to the disclosure. As shown in FIG. 12, the mobile terminal 30 includes the device 1100 and a browser.

The third embodiment according to the disclosure is described with reference to FIG. 9 to FIG. 12 as above. According to the present embodiment, an extended JS interface may be assembled according to an open API so as to execute various JavaScript by using the assembled JS interface as required by a user, thus more functions of a browser may be obtained by using extended JS and extension modes which are more flexible.

In an example of performing page layout control by using the extended JS interface according to the present embodiment, the problem of bad browser experience of a user caused by different layout modes of a mobile phone browser can be solved by using the extended JS interface. In the example, a layout mode of the mobile phone browser can be changed dynamically by means of an extension program as required by contents of a page, thus enabling different web pages to use different layout modes so as to improve the user browsing experience.

In addition, typically, the mobile terminal of the disclosure may be various handheld terminal devices, such as a mobile phone, a Personal Digital Assistant (PDA), and so on. Therefore, the protection scope of the disclosure should not be limited to a specific type of mobile terminal.

Obviously, those skilled in the art should understand that the modules or steps of the disclosure may be implemented by general computing devices and centralized in a single computing device or distributed in a network consisting of multiple computing devices. Optionally, the modules or steps may be implemented by program codes executable by a computing device, so that they may be stored in a storage device and executed by the computing device. The computing device may be a processor, such as a Central Processing Unit (CPU). Preferably, the computing device is configured in a handheld mobile terminal such as a mobile phone, a PDA, a tablet computer etc., and in some cases, the steps as shown or described may be executed in sequences different from those herein, or they may be made into integrated circuit modules, or multiple modules or steps may be implemented by being manufactured into a single integrated circuit module. By doing so, the disclosure is not limited to any specific combination of hardware and software.

In addition, it should be understood that the computer-readable storage device (e.g. a storage device) described herein may be a volatile memory or a non-volatile memory, or may include both the volatile memory and the non-volatile memory. As a non-limiting example, the non-volatile memory may include a Read-Only Memory (ROM), a Programmable ROM (PROM), an Electrically PROM (EPROM), an Electrically Erasable PROM (EEPROM), or a flash memory. The volatile memory may include a Random-Access Memory (RAM) and the RAM may be used as an external cache memory. As a non-limiting example, the RAM may be obtained in various forms such as a Synchronous RAM (SRAM), a Dynamic RAM (DRAM), a Synchronous DRAM (SDRAM), a Double Data Rate SDRAM (DDR SDRAM), an Enhanced SDRAM (ESDRAM), a Synchronous Link DRAM (SLDRAM), and a Direct Rambus RAM (DRRAM). It is intended that the disclosed storage devices include but not are limited to these and other suitable types of storage devices.

Those skilled in the art will further understand that various exemplary logic blocks, modules, circuits and algorithm steps described in combination with the disclosure herein can be implemented as electronic hardware, computer software or a combination thereof. In order to clearly illustrate the interchangeability between the hardware and software, the functions of various exemplary components, blocks, modules, circuits and steps have been generally described. Whether the functions are implemented as software or hardware depends on specific applications and design limitation imposed on the entire system. Those skilled in the art can use a variety of ways to realize the described functions for each specific application. However, such realization decision should not be interpreted as departing from the scope of the disclosure.

The various exemplary logic blocks, modules, and circuits described in combination with the disclosure herein can be realized or executed by using the following components designed for performing the functions disclosed herein: a general-purpose processor, a Digital Signal Processor (DSP), an Application Specific Integrated Circuit (ASIC), a Field Programmable Gate Array (FPGA) or other programmable logic devices, discrete gates or transistor logic, discrete hardware components, or any combination of these components. The general-purpose processor may be a microprocessor. Alternatively, however, the processor may be any conventional processor, controller, microcontroller or state machine. The processor may be also implemented as a combination of computing devices, such as a combination of a DSP and a microprocessor, multiple microprocessors, one or more microprocessors integrated with a DSP core, or any other such configurations.

The methods or algorithm steps disclosed herein may be embodied in hardware directly, in software modules executed by processors, or in a combination of both. The software modules can reside in an RAM memory, a flash memory, an ROM memory, an EPROM memory, an EEPROM memory, a register, a hard disk, a removable disk, a Compact Disc ROM (CD-ROM), or any other form of storage medium known in the art. An exemplary storage medium is coupled to a processor, such that the processor can read information from the storage medium and write information to the storage medium. In an alternative, the storage medium can be integrated with the processor. The processor and the storage medium may reside in an ASIC. The ASIC may reside in a user terminal. In an alternative, the processor and the storage medium may reside as discrete components in the user terminal.

The above are only preferred embodiments of the disclosure and should not be used for limiting the disclosure. For those skilled in the art, the disclosure may have various modifications and changes. Any modifications, equivalent replacements, improvements and the like within the spirit and principle of the disclosure shall fall within the scope of protection of the disclosure.

What is claimed is:

1. A webpage browsing method based on a web based framework, comprising:
   a web based application invoking the first scripting application to determine whether a current webpage is a customizable forum page after a first message which is sent by a browser indicating to invoke a first scripting application preregistered in the web based framework is received wherein the first scripting application is set to be invoked after a head node is constructed, and is configured to determine a forum type of the current webpage; the first message is sent after the HEAD node of the current webpage is constructed when a webpage is loaded to the browser;
   when it is determined that the current webpage is a customizable forum page and a second message sent by the browser which indicates to invoke a second scripting application preregistered in the web based framework is received, the web based application invoking the second scripting application corresponding to the forum type of the current webpage to generate and display a customized forum page; the second scripting application is set to be invoked after a Document Object Model (DOM) tree is constructed and is configured to generate and display a forum page; the second message is sending after a DOM tree of the current webpage is constructed during the webpage is loaded to the browser.

2. The webpage browsing method according to claim 1, wherein the first scripting application and the second scripting application are formed by a content script and pre-compiled in a web based application installation package, and
   when the web based application installation package is installed on the browser, the first and second scripting applications are registered in the web based framework.

3. The webpage browsing method according to claim 1, wherein the first scripting application is configured to:
   obtain a meta tag from a HEAD node; and
   determine a forum type of the webpage according to the obtained meta tag; and
   the second scripting application is configured to:
   extract forum page data corresponding to a customized forum mode in the current webpage through the DOM tree is traversed;
   generate a forum page according to the extracted forum page data; and
   display the generated forum page.

4. The webpage browsing method according to claim 3, wherein before displaying the generated forum page, the method further comprises: hiding or deleting the original scripting page.

5. The webpage browsing method according to claim 2, wherein it further comprises:
   a web based application invoking the third scripting application and the third scripting application is configured to perform the following process after a third message sent is received by the browser which indicates to invoke a third scripting application pre-registered in a web based framework:
   traversing a DOM tree to obtain a keyword included in a DOM node text;

determining whether the keyword is a pre-read keyword based on the keyword included in the DOM node text and a pre-read keyword pre-stored in the web based framework;

repeating the following process for each pre-read keyword until all pre-read keywords are processed after the included keyword is determined that is a pre-read keyword;

according to the currently-obtained pre-read keyword, obtaining a link address of the next webpage;

according to the obtained link address, pre-reading a content of the next webpage from a webpage server; and displaying the pre-read content of the next webpage and obtaining the next pre-read keyword;

wherein the third message is sent after a DOM tree of a current webpage is constructed; the third scripting application is set to be invoked after the DOM tree is constructed and to be formed by a content script, and is pre-compiled in a web based application installation package, and the third scripting application is registered in the web based framework when the web based application installation package is installed on the browser.

6. The webpage browsing method according to claim 5, wherein before displaying the pre-read content of the next webpage, the method further comprises: splicing the pre-read next webpage and the current webpage; and displaying the pre-read content of the next page when the page scrolling distance of the current webpage exceeds a preset threshold.

7. The webpage browsing method according to claim 6, wherein splicing the pre-read content of the next webpage and the current webpage comprises:

only extracting a body node of the next webpage from the pre-read next webpage;

changing the extracted body node into a DIV node while maintaining contents of the body node;

setting an attribute of the DIV node to be hidden and then attached to the tail of a body node of the current webpage.

8. The webpage browsing method according to claim 5, wherein it further comprises a web based application invoking the fourth scripting application to perform a process of determining a pre-read keyword after a fourth message which is sent by a browser is received and indicating to invoke a fourth scripting application preregistered in the web based framework, and pre-reading and displaying contents of a webpage based on the determined pre-read keyword, wherein the fourth message is sent after a DOM tree of a current webpage is constructed; the fourth scripting application is set to be invoked after a DOM tree is constructed and is formed by a content script, and is pre-compiled in a web based application installation package, and the fourth scripting application is registered in the web based framework when the web based application installation package is installed on the browser.

9. The webpage browsing method according to claim 8, wherein the process of determining the pre-read keyword, and pre-reading and displaying the contents of the webpage based on the determined pre-read keyword comprises:

traversing a DOM tree to obtain a keyword included in a DOM node text;

determining whether the keyword is a pre-read keyword based on the keyword included in the DOM node text and a keyword database pre-stored in the web based framework;

repeating the following process for each pre-read keyword until all pre-read keywords are processed after the included keyword that is a pre-read keyword is determined;

according to the currently-obtained pre-read keyword, obtaining a link address of the next webpage;

according to the obtained link address, pre-reading a content of the next webpage from a webpage server; and displaying the pre-read content of the next webpage and obtaining the next pre-read keyword.

10. The webpage browsing method according to claim 1, wherein operations of the second scripting application, the third scripting application, and/or the fourth scripting application are executed by using an extended scripting application interface.

11. The webpage browsing method according to claim 10, wherein when the contents of the current webpage are displayed, the extended scripting application interface is further configured to:

according to an extracted content, set a layout mode of the browser by presetting an interface configured to adjust a page layout mode.

12. A system comprising:

a processor; and a non-transitory computer-readable medium having a program code executable by the processor, when executed, the program code enables the processor to:

develop a web based framework configured to:

invoke a first scripting application to determine whether a current webpage is a customizable forum page, after a first message is received sent by a browser which indicates to invoke the first scripting application preregistered in the web based framework, wherein the first scripting application is set to be invoked after a HEAD node is constructed, wherein the first scripting application is configured to determine a forum type of the current webpage; and wherein the first message is sent after the HEAD node of the current webpage is constructed when a webpage is loaded to the browser; and invoke a second scripting application corresponding to the forum type of the current webpage to generate and display a customized forum page, after a second message which is sent by the browser is received and indicates to invoke the second scripting application preregistered in the web based framework when it is determined that the current webpage is a customizable forum page, wherein the second scripting application is set to be invoked after a Document Object Model (DOM) tree is constructed and is configured to generate and display a forum page; and wherein the second message is sent after a DOM tree of the current webpage is constructed during the webpage is loaded to the browser.

13. The system according to claim 12, wherein the web based framework is further configured to:

invoke a third scripting application to execute a process of determining a pre-read keyword, and pre-reading and displaying contents of a webpage based on the determined pre-read keyword, after a third message which is sent by the browser is received and indicates to invoke the third scripting application preregistered in the web based framework,
wherein the third message is sent after a DOM tree of a current webpage is constructed; the third scripting application is set to be invoked after a DOM tree is constructed and to be formed by a content script, and is pre-compiled in a web based application installation package, and the third scripting application is registered in the web based framework when the web based application installation package is installed on the browser.

14. The system according to claim 13, wherein the process of determining the pre-read keyword, and pre-reading and displaying the contents of the webpage based on the determined pre-read keyword comprises:
traversing a DOM tree to obtain a keyword included in a DOM node text;
determining whether the keyword is a pre-read keyword based on the keyword included in the DOM node text and a keyword database pre-stored in the web based framework;
after determining that the included keyword is a pre-read keyword, repeating the following process for each pre-read keyword until all pre-read keywords are processed;
according to the currently-obtained pre-read keyword, obtaining a link address of the next webpage;
according to the obtained link address, pre-reading a content of the next webpage from a webpage server; and
displaying the pre-read content of the next webpage and obtaining the next pre-read keyword.

15. The system according to claim 13, wherein the web based framework is further configured to:
invoke a fourth scripting application to perform a process of determining a pre-read keyword after a fourth message is received which is sent by a browser and indicates to invoke the fourth scripting application preregistered in the web based framework, and pre-reading and displaying contents of a webpage based on the determined pre-read keyword,
wherein the fourth message is sent after a DOM tree of a current webpage is constructed; the fourth scripting application is set to be invoked after a DOM tree is constructed and is formed by a content script, and is pre-compiled in a web based application installation package, and the fourth scripting application is registered in the web based framework when the web based application installation package is installed on the browser.

16. The system according to claim 15, wherein the process of determining the pre-read keyword, and pre-reading and displaying the contents of the webpage based on the determined pre-read keyword comprises:
traversing a DOM tree to obtain a keyword included in a DOM node text;
determining whether the keyword is a pre-read keyword based on the keyword included in the DOM node text and a keyword database pre-stored in the web based framework;
repeating the following process for each pre-read keyword until all pre-read keywords are processed after the included keyword that is a pre-read keyword is determined;
according to the currently-obtained pre-read keyword, obtaining a link address of the next webpage;
according to the obtained link address, pre-reading a content of the next webpage from a webpage server; and
displaying the pre-read content of the next webpage and obtaining the next pre-read keyword.

17. The system according to claim 12, wherein operations of the second scripting application, a third scripting application, and/or a fourth application are executed by using an extended scripting application interface, and
when the contents of the current webpage are displayed, the extended scripting application interface is configured to:
according to an extracted content, set a layout mode of the browser by presetting an interface configured to adjust a page layout mode.

18. A mobile terminal, comprising:
a processor; and
a non-transitory computer-readable medium having program code, the program code with the processor cause the mobile terminal to:
present an interface for developing a web based framework comprising:
a web based application configured to invoke a first scripting application to determine whether a current webpage is a customizable forum page, after a first message is received sent by a browser which indicates to invoke the first scripting application preregistered in the web based framework, wherein the first scripting application is set to be invoked after a HEAD node is constructed, and is configured to determine a forum type of the current webpage; wherein the first message is sent after the HEAD node of the current webpage is constructed when a webpage is loaded to the browser; and
invoke a second scripting application corresponding to the forum type of the current webpage to generate and display a customized forum page, after a second message which is sent by the browser is received and indicates to invoke the second scripting application preregistered in the web based framework when it is determined that the current webpage is a customizable forum page, wherein the second scripting application is set to be invoked after a Document Object Model (DOM) tree is constructed and is configured to generate and display a forum page; wherein the second message is sent after a DOM tree of the current webpage is constructed when the webpage is loaded to the browser; and
a browser comprising:
a first message sending unit configured to send a first message indicating to invoke a first scripting application preregistered in a web based framework upon a HEAD node of a current webpage is constructed when the webpage is loaded, wherein the first scripting application is set to be invoked after the HEAD node is constructed and is configured to determine a forum type of the current webpage, and
a second message sending unit configured to send a second message indicating to invoke a second scripting application preregistered in the web based framework and corresponding to the forum type of the current webpage after the DOM tree of the current webpage is constructed when the webpage is loaded; the second scripting application is set to be invoked after the DOM tree is constructed and is configured to generate and display a forum page.

19. A non-transitory computer-readable medium having a program code executable by a processor, when executed, the program code enables the processor to perform the following steps:
inquiring an extension program whether to execute extended scripting application at a predetermined occasion when a webpage is loaded, wherein the extension program is loaded when a browser is started up;
the browser assembles an extended scripting application interface according to an open Application Programming Interface (API) when determining that the extended scripting application is needed to be executed;
executing the extended scripting application by using the extended scripting application interface, wherein the program code further enables the processor to perform the following steps:
a web based application invoking a first scripting application to determine whether a current webpage is a customizable forum page after a first message which is sent by a browser and indicates to invoke the first scripting application preregistered in a web based framework is received; the first scripting application is set to be invoked after a HEAD node is constructed, and is configured to determine a forum type of the current webpage; the first message is sent after the HEAD node of the current webpage is constructed when a webpage is loaded to the browser;
when it is determined that the current webpage is a customizable forum page and after receiving a second message sent by the browser and indicates to invoke a second scripting application preregistered in the web based framework, the web based application invokes the second scripting application corresponding to the forum type of the current webpage to generate and display a customized forum page; the second scripting application is set to be invoked after a DOM tree is constructed and is configured to generate and display a forum page; the second message is sent after a DOM tree of the current webpage is constructed when the webpage is loaded to the browser.

20. A non-transitory computer-readable medium according to claim 19, wherein the program code further enables the processor to perform the following steps:
after receiving a fourth message sent by a browser which indicates to invoke a fourth scripting application preregistered in a web based framework, a web based application invokes the fourth scripting application to perform a process of determining a pre-read keyword, and pre-reading and displaying contents of a webpage based on the determined pre-read keyword,
wherein the fourth message is sent after a DOM tree of a current webpage is constructed; the fourth scripting application is set to be invoked after a DOM tree is constructed and is formed by a content script, and is pre-compiled in a web based application installation package, and the fourth scripting application is registered in the web based framework when the web based application installation package is installed on the browser.

21. A method for executing extended scripting application by using an extended scripting application interface, comprising:
inquiring an extension program whether to execute the extended scripting application at a predetermined occasion when a webpage is loaded, wherein the extension program is loaded when a browser is started up;
the browser assembles the extended scripting application interface according to an open Application Programming Interface (API) when determining that the extended scripting application is needed to be executed;
executing the extended scripting application by using the extended scripting application interface, wherein the extended scripting application is executed to perform the following steps:
a web based application invoking a first scripting application to determine whether a current webpage is a customizable forum page after a first message which is sent by the browser is received and indicates to invoke the first scripting application preregistered in a web based framework, wherein the first scripting application is set to be invoked after a head node is constructed, and is configured to determine a forum type of the current webpage; the first message is sent after the head node of the current webpage is constructed during the webpage is loaded to the browser;
the web based application invoking a second scripting application corresponding to the forum type of the current webpage to generate and display a customized forum page after a second message which is sent by the browser indicating to invoke the second scripting application preregistered in the web based framework is received, when it is determined that the current webpage is a customizable forum page, wherein the second scripting application is set to be invoked after a DOM tree is constructed and is configured to generate and display a forum page; the second message is sent after a DOM tree of the current webpage is constructed during the webpage is loaded to the browser.

22. The method according to claim 21, wherein the extended scripting application is executed to perform the following steps:
extracting a content required by page browsing, through accessing a Document Object Model (DOM) tree of a current webpage;
setting a layout mode of the browser through a preset interface according to the extracted content, wherein the preset interface is configured to adjust a layout mode; and
performing page layout for the extracted content based on the set layout mode.

23. The method according to claim 21, wherein the extended scripting application is executed to perform the following steps:
a web based application invoking a fourth scripting application to execute the following steps after a fourth message sent by the browser is received which indicates to invoke the fourth scripting application preregistered in a web based framework:
traversing a DOM tree to obtain a keyword included in a DOM node text;
determining whether the keyword is a pre-read keyword based on the keyword included in the DOM node text and a keyword database pre-stored in the web based framework;

repeating the following process for each pre-read keyword until all pre-read keywords are processed after the included keyword is determined that is a pre-read keyword;

according to the currently-obtained pre-read keyword, obtaining a link address of the next webpage;

according to the obtained link address, pre-reading a content of the next webpage from a webpage server; and displaying the pre-read content of the next webpage and obtaining the next pre-read keyword;

wherein the fourth message is sent after a DOM tree of a current webpage is constructed; the fourth scripting application is set to be invoked after a DOM tree is constructed and is formed by a content script, and is pre-compiled in a web based application installation package, and the fourth scripting application is registered in the web based framework when the web based application installation package is installed on the browser.

* * * * *